(12) United States Patent
Okada

(10) Patent No.: US 6,682,823 B2
(45) Date of Patent: Jan. 27, 2004

(54) CURABLE COMPOSITION FOR POLYMER ELECTROLYTE

(75) Inventor: Kenji Okada, Kobe (JP)

(73) Assignee: Kaneka Corporation, Osaka (JP)

(*) Notice: Subject to any disclaimer, the term of this patent is extended or adjusted under 35 U.S.C. 154(b) by 259 days.

(21) Appl. No.: 09/852,753

(22) Filed: May 11, 2001

(65) Prior Publication Data
US 2002/0051911 A1 May 2, 2002

Related U.S. Application Data

(63) Continuation-in-part of application No. PCT/JP99/05592, filed on Oct. 12, 1999.

(30) Foreign Application Priority Data

Oct. 28, 1998 (JP) .............................. 10-306234

(51) Int. Cl.$^7$ .................. B32B 25/20; C08L 83/12; H01M 6/18; H01G 9/38; H01B 1/20
(52) U.S. Cl. ................. 428/448; 428/447; 429/46; 429/303; 429/313; 429/321; 429/322; 429/323; 524/401; 524/406; 524/408; 524/413; 524/588; 524/779; 524/861; 524/862; 252/62.2; 252/299.2; 252/521.3
(58) Field of Search .................. 429/46, 321, 313, 429/322, 323, 303; 428/447, 448; 524/588, 413, 401, 406, 408, 779, 861, 862; 252/521.3, 62.2, 297.2

(56) References Cited

U.S. PATENT DOCUMENTS

| | | | |
|---|---|---|---|
| 5,091,274 A | | 2/1992 | Hsiue et al. |
| 5,112,512 A | * | 5/1992 | Nakamura .................. 252/62.2 |
| 5,272,021 A | * | 12/1993 | Asai et al. .................. 429/313 |
| 5,609,974 A | * | 3/1997 | Sun ............................ 429/317 |
| 5,733,683 A | * | 3/1998 | Searson et al. ............. 429/213 |
| 5,789,106 A | * | 8/1998 | Rosenmeier et al. ........... 429/33 |
| 6,159,389 A | * | 12/2000 | Miura et al. ............... 252/62.2 |
| 6,447,952 B1 | * | 9/2002 | Spiegel et al. ........... 429/218.1 |

FOREIGN PATENT DOCUMENTS

| | | |
|---|---|---|
| JP | 2-24976 | 1/1990 |
| JP | 5-98169 | 4/1993 |

OTHER PUBLICATIONS

Machine translation of JP–05–098169 obtained from the JPO website Apr. 1993.*
Zhu et al, Synthesis of Polysiloxanes Bearing Cyclic Carbonate Side Chain Dielectric Properties and Ionic Conductivities of Lithium Triflate Complexes, Macromolecules 1994, 27, 4076–4079, 1994., no month.

* cited by examiner

Primary Examiner—Jeffrey B. Robertson
(74) Attorney, Agent, or Firm—Connely Bove Lodge & Hutz LLP

(57) ABSTRACT

It is the object of the present invention to provide a curable composition capable of giving a polymer electrolyte showing a high level of ionic conductivity and excellent mechanical strength as well. The invention provides a curable composition for polymer electrolyte which comprises the following constituents (A) to (D) as essential constituents:

(A) a polysiloxane having a polyethylene oxide structure-containing group and/or a cyclic carbonate structure-containing group as a substituent on a silicon atom and having two or more SiH groups;

(B) a compound having at least one structure selected from the group consisting of a phenylene unit, a siloxy linkage, an Si—N bond, a carbonyl group, an amide linkage and an amino group and having two or more alkenyl groups;

(C) a hydrosilylation catalyst; and (D) an electrolyte salt compound.

24 Claims, 7 Drawing Sheets

US 6,682,823 B2

CURABLE COMPOSITION FOR POLYMER ELECTROLYTE

CROSS-REFERENCE TO RELATED APPLICATION

This application is a continuation-in-part of copending of international application PCT/JP99/05592 filed Oct. 12, 1999, which designated the U.S.

TECHNICAL FIELD

The present invention relates to a curable composition for polymer electrolyte as well as a polymer electrolyte produced therefrom and a polymer battery in which the same is used.

BACKGROUND ART

For a polymer electrolyte to be usable in lithium ion batteries or electrochemical devices, it is essential that it shows a high ionic conductivity in a wide temperature range, from low to high temperatures, and shows no crystallinity. However, any polymer electrolyte meeting such necessary performance characteristics requirements collectively has not yet been developed.

In the art, such organic solvent as propylene carbonate and ethyl methyl carbonate, for instance, are widely used in polymer electrolytes to be used in polymer batteries and the like. From the boiling point/vapor pressure viewpoint, however, they generally impose limitations on the use in a high temperature range of 70 to 90° C.

Recently, polymer electrolytes, typically polyethylene oxide (hereinafter referred to as "PEO"), have been studied as means for improving the safety of such organic solvents. PEO forms complexes with salts of metals belonging to the group 1 or 2 of the periodic table of the elements, for example $LiCF_3SO_3$, $LiClO_4$, $NaCF_3SO_3$ and LiI, to show relatively good levels of ionic conductivity in a temperature range not lower than room temperature and, further, shows good storage stability. However, the ionic conductivity of PEO is highly dependent on the temperature and, while it shows good ionic conductivity at 60° C. or above, the ionic conductivity markedly lowers at temperatures not higher than 20° C. Therefore, it is difficult to incorporate it in general-purpose products which may be used at low temperatures.

As a means of improving the ionic conductivity using low-molecular PEO, a method of introducing low-molecular PEO into side chains of a vinyl polymer has been reported by D. J. Banistar et al. in Polymer, 25, 1600 (1984). Although this high-molecular material forms complexes with lithium salts, the ionic conductivity at low temperatures is not satisfactory.

Further, materials derived from polysiloxanes by introduction of low-molecular PEO onto side chains thereof are described in Journal of Power Source, 20, 327 (1987), Japanese Kokai Publication Sho-63-136409 and Japanese Kokai Publication Hei-02-265927. They are, however, insufficient in ionic conductivity, are not noncrystalline, are not easy to synthesize, occur as liquids and are poor in workability or moldability, and are insufficient in mechanical strength. For these and other reasons, they have not been put to practical use.

A hydrosilylated crosslinked compound derived from a PEO side chain- and SiH group-containing polysiloxane and an olefin having polyethylene oxide in its main chain is described in Japanese Kokai Publication Hei-03-115359. However, the ionic conductivity thereof is considerably low, namely about $4.9\times10^{-6}$ S·cm$^{-1}$, and this is not satisfactory.

SUMMARY OF THE INVENTION

It is an object of the present invention to provide a curable composition capable of giving a polymer electrolyte showing a high level of ionic conductivity and excellent in mechanical strength as well. Another object is to provide a polymer battery excellent in electrochemical characteristics.

The invention provides a curable composition for polymer electrolyte;
 which comprises the following constituents (A) to (D) as an essential constituent:

(A) a SiH group-containing polysiloxane;
(B) a compound having at least one structure selected from the group consisting of a phenylene unit, a siloxy linkage, an Si—N bond, a carbonyl group, an amide linkage and an amino group and having two or more alkenyl groups;
(C) a hydrosilylation catalyst; and
(D) an electrolyte salt compound.

In a preferred embodiment of the invention, the curable composition for polymer electrolyte comprises the following constituents (A) to (D) as an essential constituent:

(A) a polysiloxane having a polyethylene oxide structure-containing group and/or a cyclic carbonate structure-containing group as a substituent on a silicon atom and having two or more SiH groups;
(B) a compound having at least one structure selected from the group consisting of a phenylene unit, a siloxy linkage, an Si—N bond, a carbonyl group, an amide linkage and an amino group and having two or more alkenyl groups;
(C) a hydrosilylation catalyst; and
(D) an electrolyte salt compound.

The invention also provides a polymer electrolyte obtained from the above curable composition for polymer electrolyte as well as a polymer battery having a structure such that the above polymer electrolyte is disposed between an anode and a cathode.

DETAILED DISCLOSURE OF THE INVENTION

Constituent A

In the practice of the invention, any of those SiH group-containing polysiloxanes which are known in the art can be used as the constituent (A), without any limitation.

The constituent (A) polysiloxane preferably has a polyethylene oxide structure-containing group, a cyclic carbonate structure-containing group and/or a cyclic ether structure-containing group as a substituent on a silicon atom and further has two or more SiH groups. The one having a polyethylene oxide structure-containing group and/or a cyclic carbonate structure-containing group as a substituent on a silicon atom and further having two or more SiH groups is more preferred among others. In particular, from the high ionic conductivity viewpoint, the one having a polyethylene oxide structure-containing group and having two or more SiH groups is more preferred. In cases where the polymer electrolyte of the invention is used in combination with a carbonate, which is to serve as an electrolyte, the one having a polyethylene oxide structure-containing group and a cyclic carbonate structure-containing group and further having two or more SiH groups is still more preferred.

The polyethylene oxide structure-containing group so referred to herein is not particularly restricted but may be any of oxyethylene unit-containing univalent groups. The oxyethylene unit(s) may be bonded to a silicon atom either directly or via a bivalent organic group. The cyclic carbonate structure-containing group or cyclic ether structure-containing group is not particularly restricted but may be any of cyclic carbonate- or cyclic ether-containing univalent groups. The cyclic carbonate or cyclic ether may be bonded to a silicon atom either directly or via a bivalent organic group.

In cases where the constituent (A) polysiloxane has a polyethylene oxide structure-containing group as a substituent on a silicon atom, it is desirable, from the low crystallinity viewpoint, that 10 to 95% of all silicon atoms in the constituent (A) polysiloxane each has, as a substituent thereon, a polyethylene oxide structure-containing group with a degree of polymerization of the oxyethylene unit of 1 to 12 and it is more desirable that 40 to 90% of all silicon atoms in the constituent (A) polysiloxane each has, as a substituent thereon, a polyethylene oxide structure-containing group with a degree of polymerization of the oxyethylene unit of 1 to 12.

When the constituent (A) polysiloxane has a polyethylene oxide structure-containing group as a substituent on a silicon atom, the constituent (A) is preferably represented by the following structural formula:

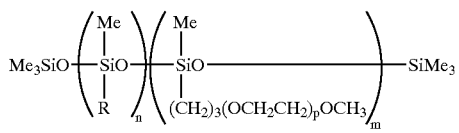

wherein m and n each is an integer of not less than 1, p is an integer of 1 to 12 and R represents a hydrogen atom or a hydrocarbon group containing 1 to 20 carbon atoms and, when n is not less than 2, the each R may be the same or different, provided that at least one of the R's is a hydrogen atom; the arrangement of the m repeating units and n repeating units may be not in order.

When the constituent (A) is represented by the above formula, the polyethylene oxide introduction percentage (%, hereinafter referred to as G) defined below is preferably 10 to 95%, more preferably 40 to 90%.

$$G=[m/(m+n+2)]\times 100.$$

The values of m and n can be calculated with ease by determining the substituent content ratio by $^1$H NMR, for instance.

When the constituent (A) polysiloxane has a polyethylene oxide structure-containing group as a substituent on a silicon atom, the constituent (A) shows a high level of permittivity and is excellent in ability to dissolve and dissociate supporting electrolytes, since the polysiloxane has the polyethylene oxide structure on a side chain thereof. Further, since the main chain thereof has a siloxane structure, its glass transition temperature is low and this facilitates the transfer of ions. Such a polymer is highly stable at high temperatures. Therefore, the prevention of degradation at high temperatures and the high ionic conductivity occurrence at low temperatures, which have not been achieved with the prior art polymer electrolytes, can be accomplished in accordance with the present invention.

When the constituent (A) polysiloxane has a cyclic carbonate structure-containing group as a substituent on a silicon atom, the constituent (A) is preferably represented by the following structural formula:

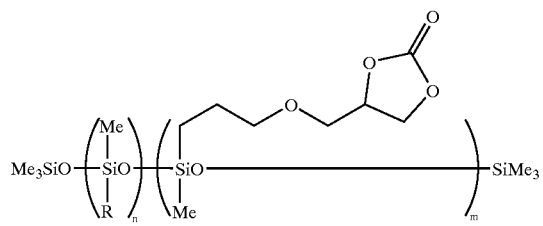

wherein m and n each is an integer of not less than 1 and R represents a hydrogen atom or a hydrocarbon group containing 1 to 20 carbon atoms and, when n is not less than 2, the each R may be the same or different, provided that at least one of the R's is a hydrogen atom; the arrangement of the m repeating units and n repeating units may be not in order.

When the constituent (A) polysiloxane has a cyclic ether structure-containing group as a substituent on a silicon atom, the constituent (A) is preferably represented by the following structural formula:

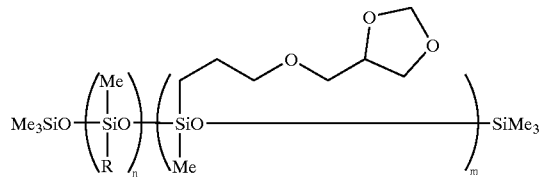

wherein m and n each is an integer of not less than 1 and R represents a hydrogen atom or a hydrocarbon group containing 1 to 20 carbon atoms and, when n is not less than 2, the each R may be the same or different, provided that at least one of the R's is a hydrogen atom; the arrangement of the m repeating units and n repeating units may be not in order.

When the constituent (A) polysiloxane has a cyclic carbonate structure-containing group or a cyclic ether structure-containing group as a substituent on a silicon atom, too, the permittivity of the constituent (A) becomes high and the constituent (A) is excellent in ability to dissolve and dissociate supporting electrolytes. Since its main chain has a siloxane structure, its glass transition temperature is low, which facilitates the transfer of ions. Such a polymer is highly stable at high temperatures: Therefore, the prevention of degradation at high temperatures and the high ionic conductivity occurrence at low temperatures, which have not been achieved with the prior art polymer electrolytes, can be accomplished in accordance with the present invention.

Preferably, the constituent (A) polysiloxane is substantially free of any hydrolyzable silyl group (group capable of undergoing mutual binding and condensation to form a siloxane bond in the presence of water; specifically SiOH and SiOR groups (R being an alkyl group, an aryl group or the like). If the constituent (A) polysiloxane has a hydrolyzable silyl group, the hydrolyzable silyl group reacts with an SiH group to form hydrogen or an alcohol. As a result, the SiH group content decreases and no sufficient crosslinked structure is formed and/or the hydrogen or alcohol generation causes foaming in the curing product, with the result that it becomes difficult to obtain satisfactory membranes.

The constituent (A) polysiloxane preferably has a weight average molecular weight Mw (on the polystyrene equivalent basis) of 600 to 100,000, more preferably 2,000 to 100,000.

The constituent (A) may comprise one single species or a combination of two or more species.

The constituent (A) SiH group-containing polysiloxane can be synthesized, for example, by the process mentioned below. The method of preparing the constituent (A) is not limited to that process, however.

To a polyorganohydrogensiloxane are added, in a solvent, dropwise a hydrosilylation catalyst and olefin-terminated polyethylene oxide to thereby effect the hydrosilylation reaction and, after thorough stirring, the solvent is distilled off under reduced pressure, whereby a polysiloxane having a polyethylene oxide structure-containing group as a substituent on a silicon atom can be obtained.

The polysiloxane to be used in the above process preferably has a weight average molecular weight Mw (on the polystyrene equivalent basis) of 2,000 to 100,000.

The solvent to be used here is not particularly restricted but includes, as preferred species, toluene and the like.

The reaction temperature is not particularly restricted but the reaction is preferably carried out at room temperature to 100° C.

The ratio between the olefin-terminated polyethylene oxide to be added and the SiH groups in the polysiloxane (olefinic group/SiH mole ratio) is preferably within the range of 0.10 to 0.95, more preferably 0.40 to 0.90, most preferably 0.50 to 0.85.

The hydrosilylation catalyst is not particularly restricted but includes, as preferred species, platinum compounds, rhodium compounds and ruthenium compounds. As examples, there may be mentioned platinum-vinylsiloxane and chloroplatinic acid.

This production process can be carried out batchwise, semibatchwise or continuously. The reaction vessel may be a continuous mixing tank reaction vessel, for instance. This process is preferably carried out batchwise or continuously.

For obtaining a polysiloxane having both a polyethylene oxide structure-containing group and a cyclic carbonate structure-containing group each as a substituent on a silicon atom, a terminal olefin-containing cyclic carbonate compound as well as the olefin-terminated polyethylene oxide are added.

Other polysiloxanes can be obtained in the same manner.

Constituent B

Any of those compounds known in the art which have at least one structure selected from the group consisting of a phenylene unit, a siloxy linkage, an Si—N bond, a carbonyl group, an amide linkage and an amino group and have two or more alkenyl groups can be used as the constituent (B), without any limitation. The constituent (B) preferably has a number average molecular weight Mn [GPC (polystyrene equivalent basis)] within the range of 80 to 1,000.

It is preferred that the constituent (B) is substantially free of any polyethylene oxide structure, in particular any polyalkylene oxide. Since the constituent (B) is a constituent for crosslinking the constituent (A) polysiloxane, the occurrence of such structure in the constituent (B) tends to decrease the ionic conductivity.

From the strength and moldability viewpoint, it is preferred that the constituent (B) have a low molecular weight, specifically of not more than 500, more preferably not more than 400. When the molecular weight is high, the ionic conductivity tends to lower.

As preferred examples of the constituent (B), there may be mentioned compounds having a phenylene unit and two or more alkenyl groups, compounds having a siloxy linkage and two or more alkenyl groups, compounds having an Si—N bond and two or more alkenyl groups, compounds having a carbonyl group and two or more alkenyl groups, compounds having an amide linkage and two or more alkenyl groups, compounds having an amino group and two or more alkenyl groups and compounds having a phenylene unit and a carbonyl group and two or more alkenyl groups.

Specifically, the constituent (B) includes bisphenol A diallyl ether, 2,2'-diallylbisphenol A, divinylbenzene, 1,3-divinyl-1,1,3,3-tetramethyldisiloxane, 1,3-divinyl-1,1,3,3-tetramethyldisilazane, diallyl maleate, diallyl succinate, diallyl carbonate, diallyl dicarbonate, allyl-terminated acrylic polymers, 1,3-diallylurea, diallylamine and diallyl phthalate.

The constituent (B) may comprise one single species or a combination of two or more species.

Constituent C

In the practice of the present invention, any of those hydrosilylation catalysts which are known in the art may be used as the constituent (C), without any limitation.

Preferred as the constituent (C) is at least one compound selected from the group consisting of platinum compounds, ruthenium compounds and rhodium compounds. Platinum compounds are more preferred.

As preferred species of the constituent (C), there may be mentioned platinum-vinylsiloxane, chloroplatinic acid, $Pt(COD)_2$ and the like.

The constituent (C) may comprise one single species or a combination of two or more species.

Constituent D

In the practice of the present invention, any of those electrolyte salt compounds which are known in the art may be used as the constituent (D), without any limitation.

Preferred as the constituent (D) are composed of: a cation selected from the group consisting of metal cations, ammonium ions, amidinium ions and guanidium ions and an anion selected from the group consisting of chloride ion, bromide ion, iodide ion, perchlorate ion, thiocyanate ion, tetrafluoroborate ion, nitrate ion, $AsF_6^-$, $PF_6^-$, stearylsulfonate ion, octylsulfonate ion, dodecylbenzenesulfonate ion, naphthalenesulfonate ion, dodecylnaphthalenesulfonate ion, $R^1SO_3^-$, $(R^1SO_2)(R^2SO_2)N^-$ and $(R^1SO_2)(R^2SO_2)(R^3SO_2)C^-$ [in each formula, $R^1$, $R^2$ and $R^3$ each representing an electron attracting group].

The electron-attracting groups represented by $R^1$, $R^2$ and $R^3$ in $R^1SO_3^-$, $(R^1SO_2)(R^2SO_2)N^-$ and $(R^1SO_2)(R^2SO_2)(R_3SO_2)C^-$ may be the same or different and each is preferably a perfluoroalkyl group containing 1 to 6 carbon atoms or a perfluoroaryl group.

The metal cation in the constituent (D) is preferably a cation of a metal selected from the group consisting of metals belonging to the group 1 or 2 of the periodic table and transition metals, in particular manganese, iron, cobalt, nickel, copper, zinc and silver. The lithium cation is particularly preferred.

Specifically, $LiClO_4$, $LiPF_6$, $LiBF_4$, $LiCF_3SO_3$, $LiN(CF_3SO_2)_2$ or $Li(C_2F_5SO_2)_2$ is particularly preferred as the constituent (D).

The constituent (D) may comprise one single species or a combination of two or more species.

In the curable composition for polymer electrolyte according to the invention, the mole ratio (A)/(B) between the constitutent (A) and constituent (B) is preferably 0.01 to 5.0, more preferably 0.05 to 3.0. The constituent (C) hydrosilylation catalyst is preferably used in an amount of 0.000001 to 0.1 mole, more preferably 0.00001 to 0.01 mole, per mole of the double bond in the constituent (B).

The constituent (D) electrolyte salt compound is contained in the curable composition for polymer electrolyte preferably in an amount within the range of 0.01 to 10 millimoles, more preferably 0.10 to 5.0 millimoles, per gram of that composition.

The curable composition for polymer electrolyte according to the invention provides a sufficiently high level of ionic conductivity. However, when a higher level of ionic conductivity is required, an organic electrolyte may further be incorporated. As such organic electrolyte, there may be mentioned propylene carbonate, ethylene carbonate, diethyl carbonate, dimethyl carbonate, ethyl methyl carbonate, γ-butyrolactone, 1,3-dioxolane, dimethoxyethane, tetrahydrofuran, dimethyl sulfoxide and polyethylene glycol dimethyl ether. Among them, carbonates are preferred. From the ion conductivity/strength compatibility viewpoint, the addition amount of the organic electrolyte is preferably 10 to 90% by weight, more preferably 30 to 70% by weight, based on the constituent (A).

In the curable composition for polymer electrolyte according to the invention, there may be incorporated a further polymer, another amphiphilic solvent and/or the like.

The curable composition for polymer electrolyte according to the invention, when crosslinked by the hydrosilylation reaction, forms a three-dimensional network structure. Therefore, the tasks unachievable with the prior art polymer electrolytes, namely fluidity prevention and improvements in mechanical strength and workability/moldability, can be accomplished in accordance with the present invention.

Method of polymer electrolyte production

The curable composition for polymer electrolyte can be produced by admixing the thus-obtained SiH group-containing polysiloxane (A) with the compound (B) having at least one structure selected from the group consisting of a phenylene unit, a siloxy linkage, an Si—N bond, a carbonyl group, an amide linkage and an amino group and have two or more alkenyl groups, the hydrosilylation catalyst (C) and the electrolyte salt compound (D), if necessary together with an organic electrolyte. For facilitating the molding thereof, an organic solvent may be added.

Upon heating this composition, the organic solvent, when contained therein, is evaporated and the curing reaction (hydrosilylation reaction) is allowed to proceed to give a polymer electrolyte. This polymer electrolyte is preferably caused to have a filmy shape.

The temperature in the heating step is not particularly restricted but preferably is within the range of room temperature to 150° C., more preferably room temperature to 120° C., most preferably 70 to 100° C.

In the practice of the invention, the method of polymer electrolyte production is not particularly restricted. The kind of the reaction vessel is of no importance. For preventing side reactions from occurring, however, the production process is preferably carried out in a reaction vessel made of a nonreactive material.

A polymer electrolyte containing an organic electrolyte can be obtained by heating an organic electrolyte-containing curable composition or by heating an organic electrolyte-free curable composition and impregnating the thus-obtained curing product with the organic electrolyte. The organic electrolyte-containing polymer electrolyte generally occurs as a gel.

From the strength viewpoint, it is also preferable to produce a polymer electrolyte provided with a nonwoven fabric. This can be obtained by impregnating a nonwoven fabric with the curable composition for polymer electrolyte of the invention and heating the fabric to cause the hydrosilylation reaction to proceed.

When the curable composition for polymer electrolyte as disclosed herein is used, it is easy to obtain a large-area thin film-like polymer electrolyte having flexibility, which is one of the characteristic features of macromolecules.

Polymer battery production

Polymer batteries, in particular lithium-polymer batteries, can be constructed using the polymer electrolyte obtained in accordance with the invention. Thus, polymer batteries can be made by disposing the polymer electrolyte of the invention between an anode and a cathode.

As preferred anode materials for lithium-polymer batteries, there may be mentioned, among others, lithium-manganese double oxide, lithium cobaltate, vanadium pentoxide, polyacene, polypyrene, polyaniline, polyphenylene, polyphenylene sulfide, polyphenylene oxide, polypyrrole, polyfuran, polyazulene and, further, sulfur compounds. Such anode materials may also be used in the form impregnated with the curable composition of the invention in making anodes.

Preferred as cathode materials are, for example, metallic lithium, lithium-lead alloys, other lithium alloys, inorganic materials with lithium occluded therein, and carbonaceous materials with lithium occluded between graphite or carbon layers.

It is also conceivable to use the polymer electrolyte of the invention as a diaphragm for ion electrodes sensitive to cations such as alkali metal, copper, calcium and magnesium ions to thereby utilize the high ionic conductivity thereof.

BEST MODES FOR CARRYING OUT THE INVENTION

Figure 1:
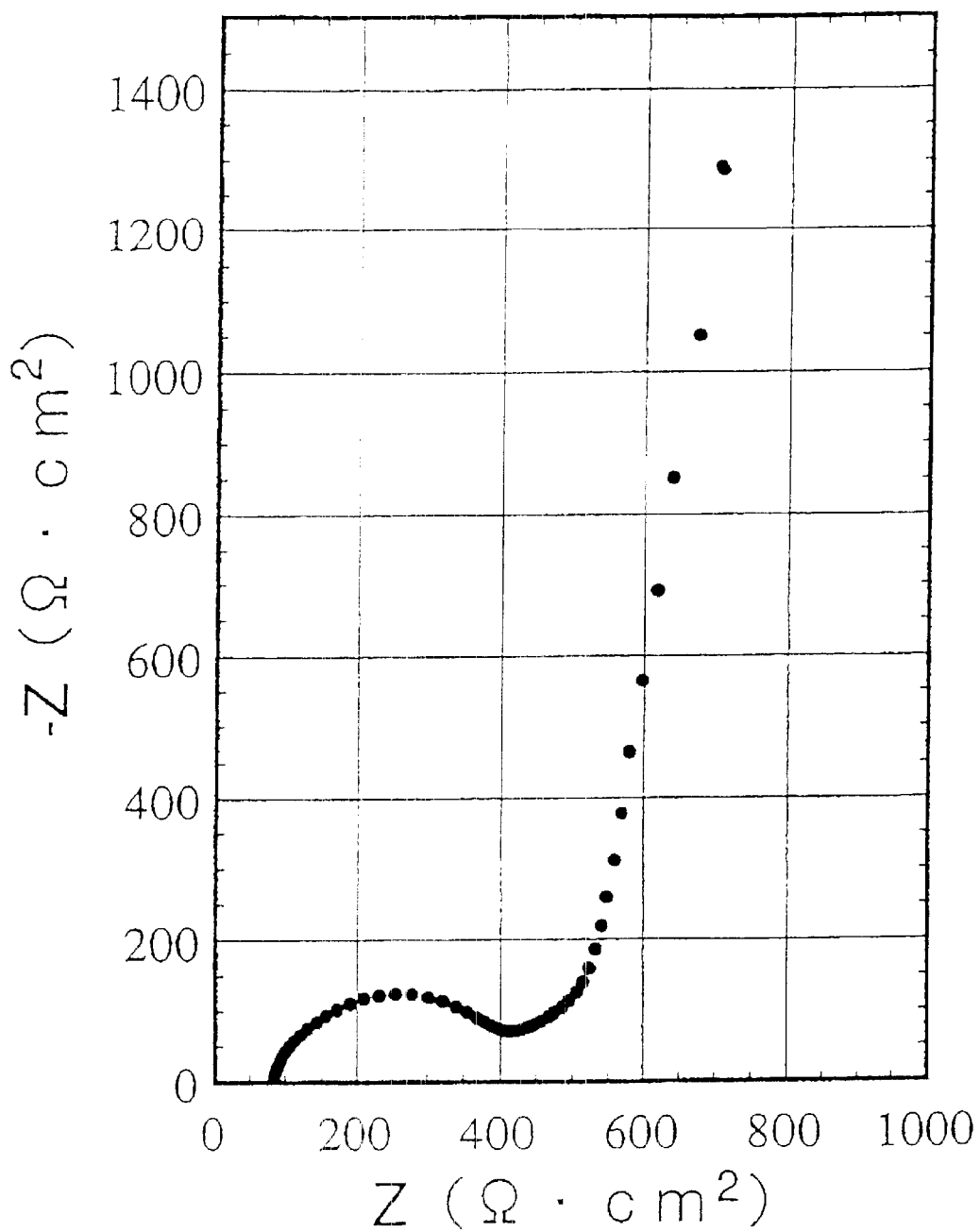
FIG. 1 shows the Cole-Cole plot at 25° C. for a lithium polymer battery comprising a solid polymer electrolyte, which is an embodiment of the invention.

In the following, several examples of the invention are described specifically. The following examples are, however, by no means limitative of the scope of the invention.

EXAMPLE 1

A reaction vessel was charged with 4 g of polymethylhydrogensiloxane, about 10 g of toluene and $1.2 \times 10^{-3}$ millimoles of platinum-vinylsiloxane, and the mixture was stirred at a reaction temperature of 80° C. To this mixture was added dropwise 24 g (58 mmol) of allyl-terminated polyethylene oxide with an average molecular weight of 400. After completion of the dripping, the reaction was allowed to proceed for 3 hours and the toluene was then distilled off under reduced pressure. As a result, a polysiloxane with a polyethylene oxide introduction percentage (percentage of silicon atoms having polyethylene oxide as a substituent thereon to all the silicon atoms occurring in the polysiloxane) of 74% was obtained.

A 3.0 g-portion of the thus-obtained polyethylene oxide-modified polysiloxane was admixed with a solution of 73 mg (0.24 mmol) of bisphenol A diallyl ether, $7.2 \times 10^{-4}$ millimoles of platinum-vinylsiloxane and 108 mg (1.0 mmol) of $LiClO_4$ in about 1 ml of tetrahydrofuran. The resulting mixture was heated at 80° C. for 4 hours using a pressing machine. As a result, the tetrahydrofuran evaporated and a colorless transparent thin film-like substance was obtained. This thin film-like substance obtained was measured for ionic conductivity by the alternating current method using platinum electrodes at a voltage of 0.5 V in a frequency range of 42 Hz to 5 MHz. As a result, the ionic conductivity at 25° C. as calculated by the complex impedance method was $1.5 \times 10^{-4}$ S/Cm.

EXAMPLE 2

A reaction vessel was charged with 4 g of polymethylhydrogensiloxane, about 10 g of toluene and $1.2 \times 10^{-3}$ millimoles of platinum-vinylsiloxane, and the mixture was stirred at a reaction temperature of 80° C. To this mixture was added dropwise allyl-terminated polyethylene oxide with an average molecular weight of 400. After completion of the dripping, the reaction was allowed to proceed for 3 hours and the toluene was then distilled off under reduced pressure. As a result, a polysiloxane with a polyethylene oxide introduction percentage of 74% was obtained.

A 3.0-g of the thus-obtained polyethylene oxide-modified polysiloxane was admixed with a solution of 43 mg (0.23 mmol) of 1,3-divinyl-1,1,3,3-tetramethyldisiloxane, $1.2 \times 10^{-3}$ millimoles of platinum-vinylsiloxane and 147 mg (1.4 mmol) of $LiClO_4$ in about 1 ml of tetrahydrofuran. The resulting mixture was heated at 80° C. for 5 hours using a pressing machine. As a result, the tetrahydrofuran evaporated and a colorless transparent thin film-like substance was obtained. This thin film-like substance obtained was measured for ionic conductivity by the alternating current method using platinum electrodes at a voltage of 0.5 V in a frequency range of 42 Hz to 5 MHz. As a result, the ionic conductivity at 25° C. as calculated by the complex impedance method was $2.4 \times 10^{-4}$ S/cm.

EXAMPLE 3

A reaction vessel was charged with 4 g of polymethylhydrogensiloxane, about 10 g of toluene and $9.0 \times 10^{-4}$ millimoles of platinum-vinylsiloxane, and the mixture was stirred at a reaction temperature of 80° C. To this mixture was added dropwise 18 g (45 mmol) of polyethylene oxide having an allyl group at one terminus and having an average molecular weight of 400. After completion of the dripping, the reaction was allowed to proceed for 5 hours and the toluene was then distilled off under reduced pressure. As a result, a polysiloxane with a polyethylene oxide introduction percentage of 55% was obtained.

A 3.0-g of the thus-obtained polyethylene oxide-modified polysiloxane was admixed with a solution of 91 mg (0.30 mmol) of bisphenol A diallyl ether, $9.0 \times 10^{-4}$ millimoles of platinum-vinylsiloxane and 540 mg (3.4 mmol) of $LiCF_3SO_3$ in about 2 ml of tetrahydrofuran. The resulting mixture was heated at 85° C. for 8 hours using a pressing machine. As a result, the tetrahydrofuran evaporated and a colorless transparent thin film-like substance was obtained. This thin film-like substance obtained was measured for ionic conductivity by the alternating current method using platinum electrodes at a voltage of 0.5 V in a frequency range of 42 Hz to 5 MHz. As a result, the ionic conductivity at 25° C. as calculated by the complex impedance method was $5.3 \times 10^{-4}$ S/cm.

COMPARATIVE EXAMPLE 1

A 3.0-g portion of the polysiloxane with a polyethylene oxide introduction percentage of 55% as obtained above in Example 3 was admixed with a solution of 61 mg (0.30 mmol) of triethylene glycol divinyl ether, $9.0 \times 10^{-4}$ millimoles of platinum-vinylsiloxane and 540 mg (3.4 mmol) of $LiCF_3SO_3$ in about 2 ml of tetrahydrofuran. The resulting mixture was heated at 85° C. for 10 hours using a pressing machine. As a result, the curing reaction did not proceed at all.

COMPARATIVE EXAMPLE 2

A 3.0-g portion of the polysiloxane with a polyethylene oxide introduction percentage of 55% as obtained above in Example 3 was admixed with a solution of 61 mg (0.30 mmol) of triethylene glycol divinyl ether, $9.0 \times 10^{-4}$ millimoles of platinum-vinylsiloxane and 170 mg (1.1 mmol) of $LiCF_3SO_3$ in about 1 ml of tetrahydrofuran. The resulting mixture was heated at 85° C. for 8 hours using a pressing machine. As a result, the tetrahydrofuran evaporated and a colorless transparent thin film-like substance was obtained.

This thin film-like substance obtained was measured for ionic conductivity by the alternating current method using platinum electrodes at a voltage of 0.5 V in a frequency range of 42 Hz to 5 MHz. As a result, the ionic conductivity at 25° C. as calculated by the complex impedance method was $3.2 \times 10^{-5}$ S/cm.

EXAMPLE 4

Curable Composition Production

A 3.0-g portion of a polyethylene oxide-modified polysiloxane obtained by the same method as described in Example 1 (modification percentage: 50%) was dissolved in about 1 ml of acetonitrile. Therein was dissolved 947 mg of $LiN(CF_3SO_2)_2$ as an electrolyte salt compound (Li/EO= 0.08). This solution was admixed with 131 mg (0.43 mmol) of bisphenol A diallyl ether and $20 \times 10^{-4}$ millimoles of platinum-vinylsiloxane and the mixture was defoamed to give a curable composition.

Polymer Electrolyte Membrane Production

A nonwoven fabric made of polypropylene, which was used as a reinforcement, was impregnated with the above curable composition and then heated in air at 90° C. for 6 hours. As a result, the acetonitrile evaporated and the hydrosilylation reaction proceeded, and a 130-$\mu$m-thick polymer electrolyte membrane was obtained.

$LiCoO_2$ Anode Preparation

A $LiCoO_2$ anode to be impregnated with the polymer electrolyte was prepared as follows:

Electrode composition: $LiCoO_2$:graphite:acetylene black: PVdF=87:9:1:3;

Electrode density: 2.68 g/cc (porosity 38%);

Electrode thickness: 51 $\mu$m;

Electrode conductivity: $1.2 \times 10^{-2}$ S/cm.

This LiCoO$_2$ anode to be impregnated with the polymer electrolyte was immersed in the curable composition obtained as described above, and vacuum impregnation was effected under reduced pressure for 1 hour. This was heated in air at 90° C. for 6 hours. As a result, the acetonitrile evaporated and the hydrosilylation reaction proceeded to give an anode with a density of 3.12 g/cc and an electrode conductivity of 8.8×10$^{-3}$ S/cm.

Lithium-polymer Battery Production

A lithium-polymer battery having the following constitution was constructed:

Anode: the LiCoO$_2$ electrode prepared as described above, 1.0×1.0 cm$^2$;

Cathode: lithium metal, area 1.2×1.2 cm$^2$;

Polymer electrolyte: the membrane prepared as described above, thickness 130 μm.

This battery was subjected to performance evaluation as follows.

Evaluation for Initial Alternating Current Impedance Characteristics

Figure 2:
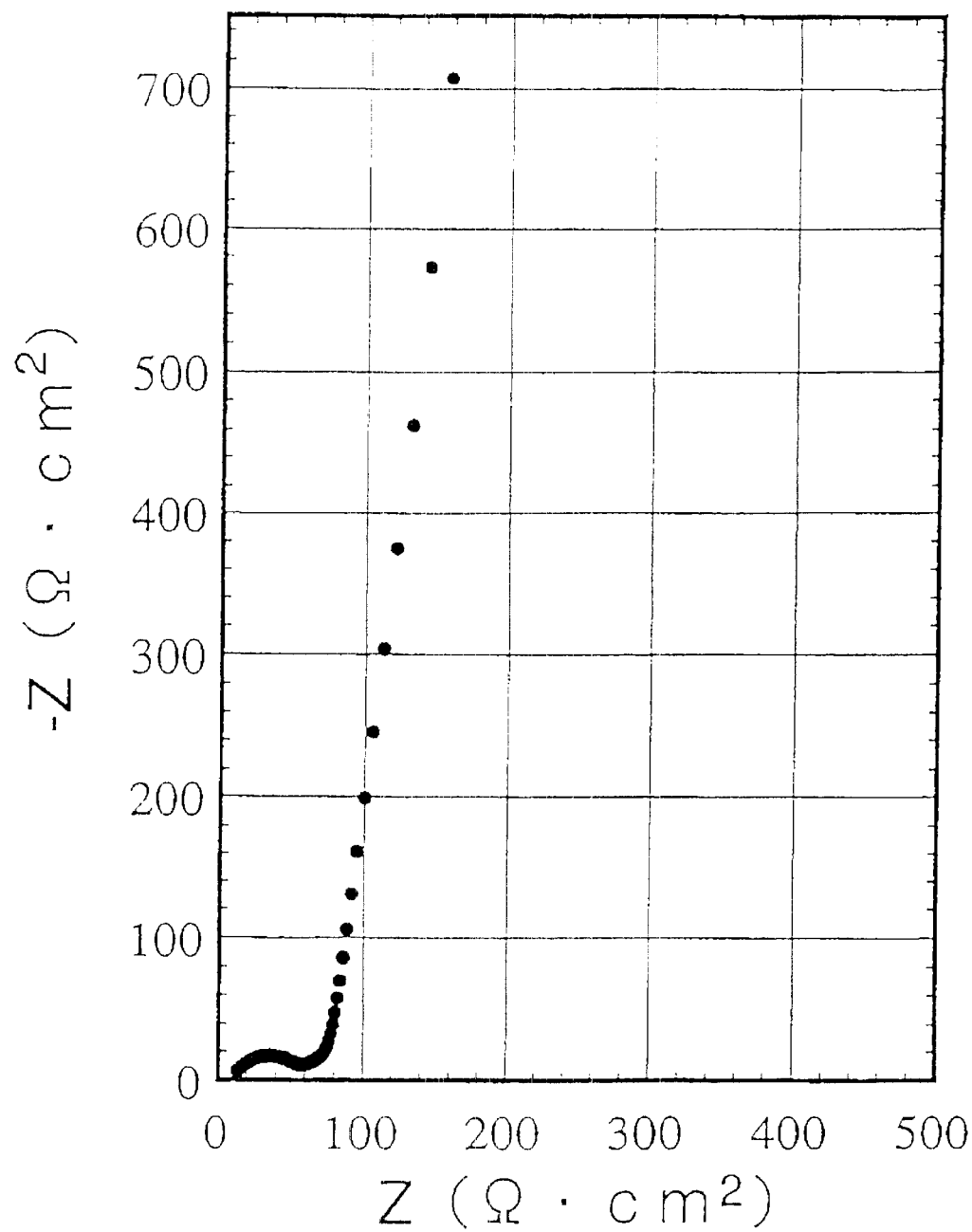
FIG. 2 shows the Cole-Cole plot at 65° C. for a lithium polymer battery comprising a solid polymer electrolyte, which is an embodiment of the invention.

The battery constructed as described above was evaluated for initial alternating current impedance characteristics under the following conditions: frequency range: 20,000 to 0.1 Hz, ΔV: 10 mV and temperature: 25° C. or 60° C. The Cole-Cole plots thus obtained are shown in FIG. 1 (25° C.) and FIG. 2 (60° C.). The initial bulk resistance, ionic conductivity and initial cathode side resistance values readable therefrom are summarized in Table 1. The ionic conductivity (S/cm) can be calculated from the bulk resistance as follows: Ionic conductivity=d/(S·R)

where

R=the bulk resistance (Ω);

d=electrolyte thickness (cm);

S=electrolyte sectional area (cm$^2$) (1 cm$^2$ in this case).

TABLE 1

|  | Initial bulk resistance (Ω · cm$^2$) | Ionic conductivity (S/cm) | Initial resistance on cathode side (Ω · cm$^2$) |
| --- | --- | --- | --- |
| 25° C. | 81 | 1.6 × 10$^{-4}$ | 355 |
| 60° C. | 9 | 1.6 × 10$^{-3}$ | 53 |

The bulk resistance is a resistance due to the electrolyte and the resistance on the cathode side is a resistance presumably due to the cathode lithium interface. Both show very good values and, in particular, the value at 60° C. is excellent. Particularly, the value of the ionic conductivity at 60° C. was 1.6×10$^{-3}$ S/cm so that the polymer electrolyte membrane can be regarded as to an excellent complete solid electrolyte.

Evaluation for Initial Charge-discharge Characteristics

The battery constructed in the above manner was evaluated for initial charge-discharge characteristics under the following conditions.

Measurement temperature: 60° C.;

Charge-discharge conditions

Charge: constant current (0.1 CA:0.16 mAh/cm$^2$)

constant voltage (4.2 V vs Li/Li$^+$); 12 hours;

Discharge: constant current (0.1 CA:0.16 mAh/cm$^2$);

termination (3.0 V vs Li/Li$^+$).

Figure 3:
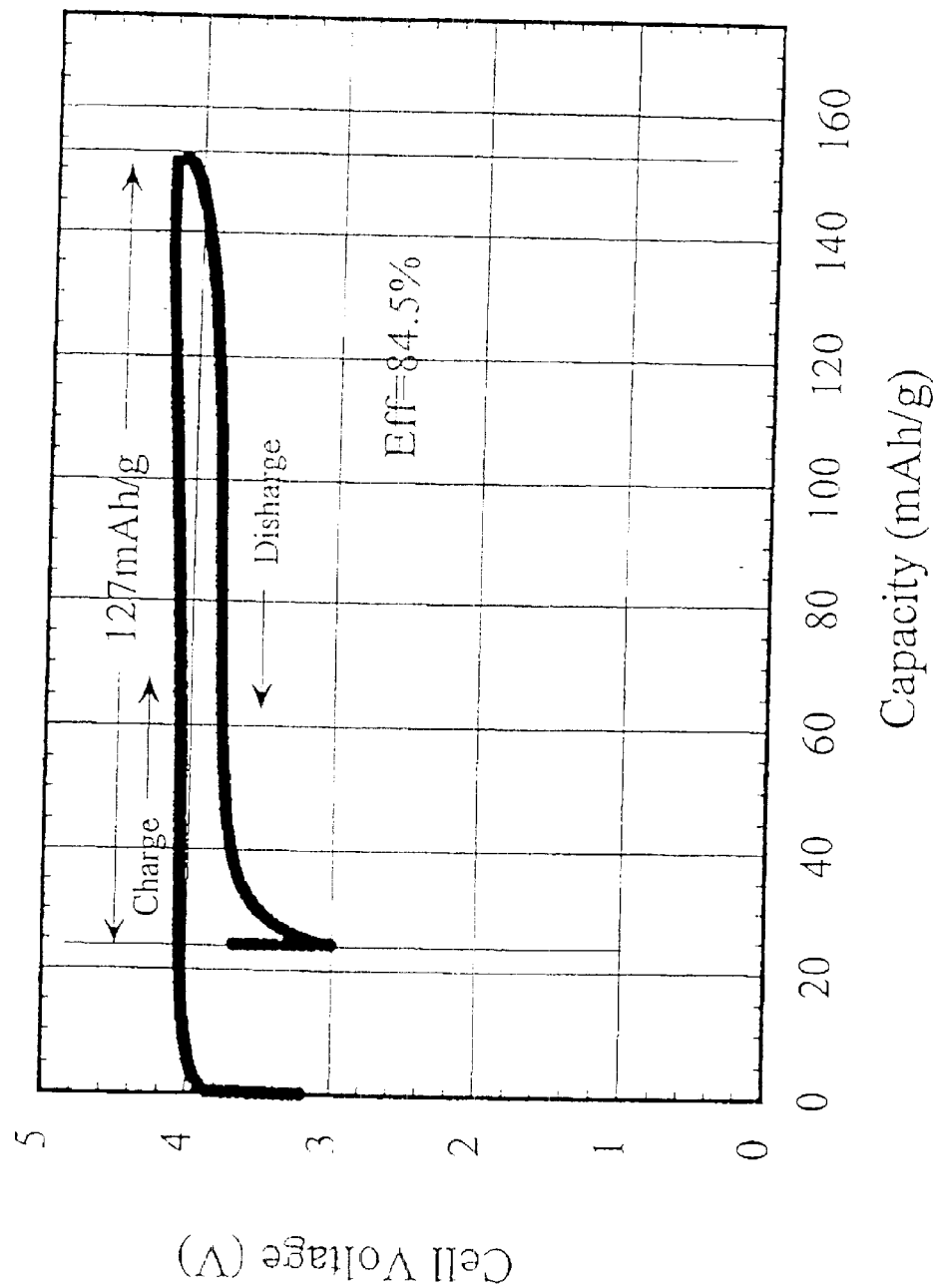
FIG. 3 shows the charge-discharge characteristics of a lithium polymer battery comprising a solid polymer electrolyte, which is an embodiment of the invention.

The initial charge-discharge curve is shown in FIG. 3. The initial capacity was 127 mAh/g and the initial efficiency was 84.5%, and the charge/discharge was possible. In the prior art, it is difficult for a polymer electrolyte to have such charge-discharge characteristics.

Evaluation for Alternating Current Impedance in Initial Charge-discharge Cycles

Figure 4:
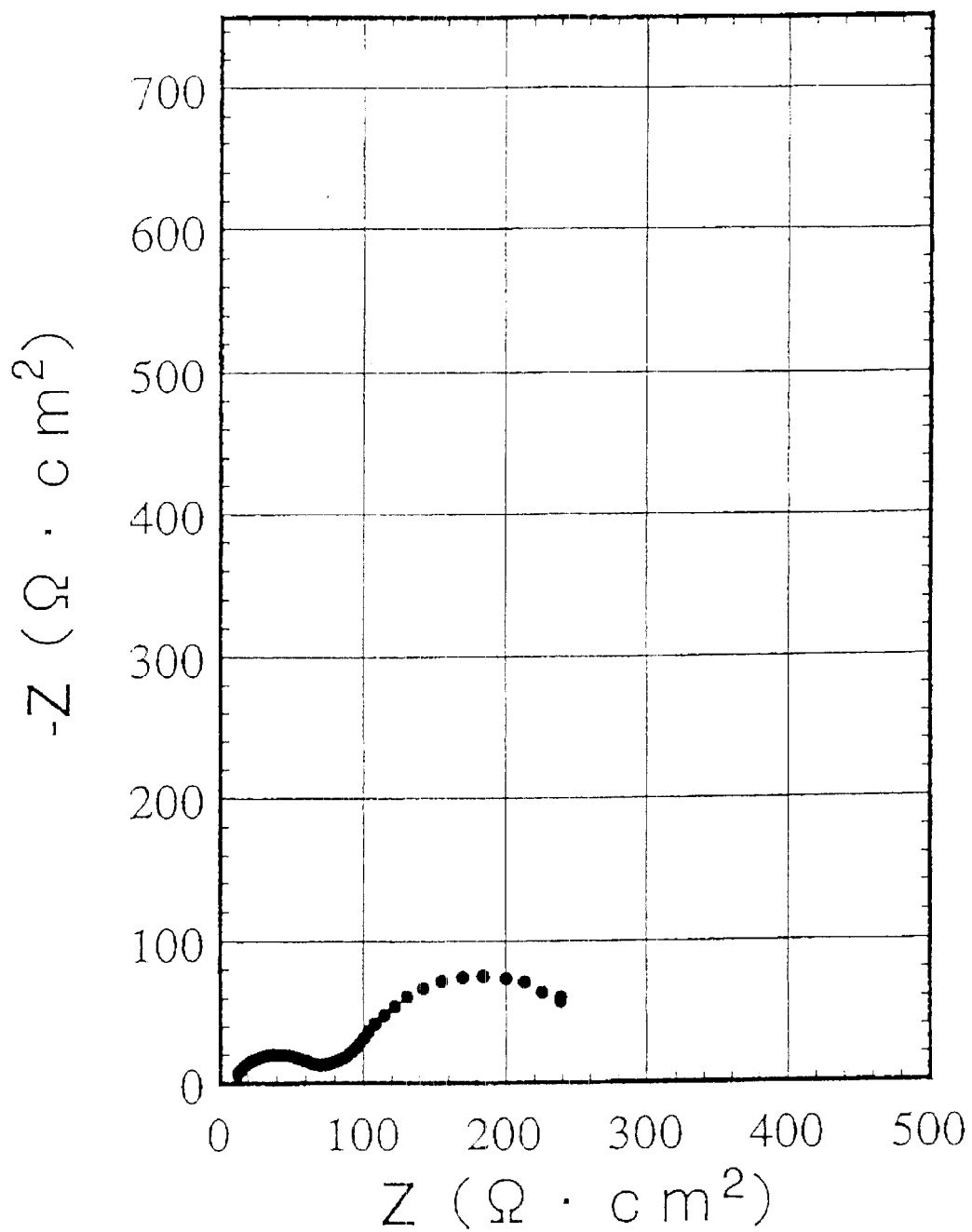
FIG. 4 shows the Cole-Cole plot at 60° C. for a lithium polymer battery comprising a solid polymer electrolyte, which is an embodiment of the invention, after one charge/discharge cycle.

The battery after completion of the first charge-discharge cycle was evaluated for alternating current impedance characteristics (frequency: 20,000 to 0.1 Hz, ΔV: 10 mV) at 60° C. The Cole-Cole plot obtained is shown in FIG. 4. The bulk resistance, cathode side resistance and anode side resistance which could be read therefrom are shown in Table 2.

Evaluation for Alternating Current Impedance after Storage

Figure 5:
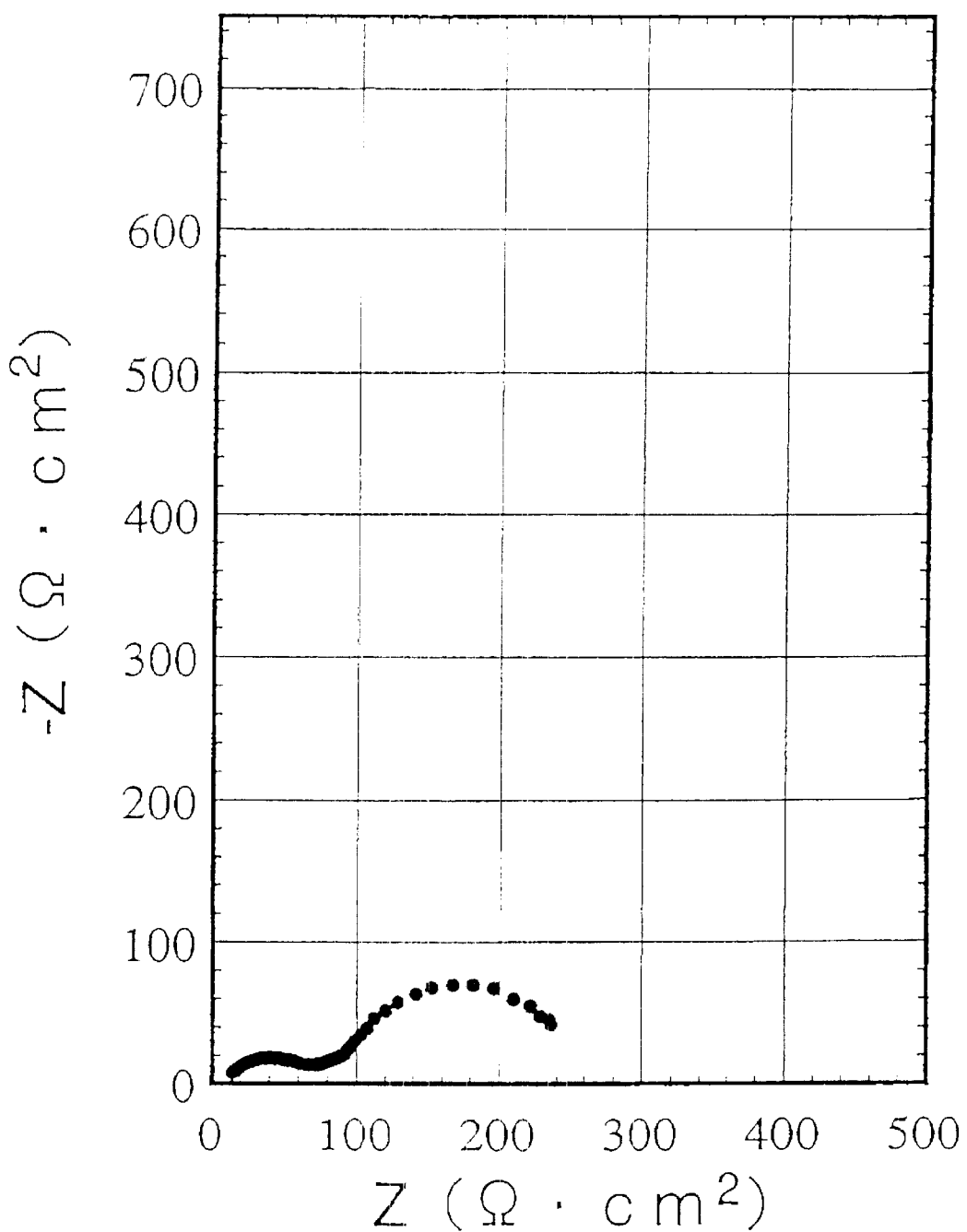
FIG. 5 shows the Cole-Cole plot at 60° C. for a lithium polymer battery comprising a solid polymer electrolyte, which is an embodiment of the invention, after 200 hours of storage at 60° C.
Figure 6:
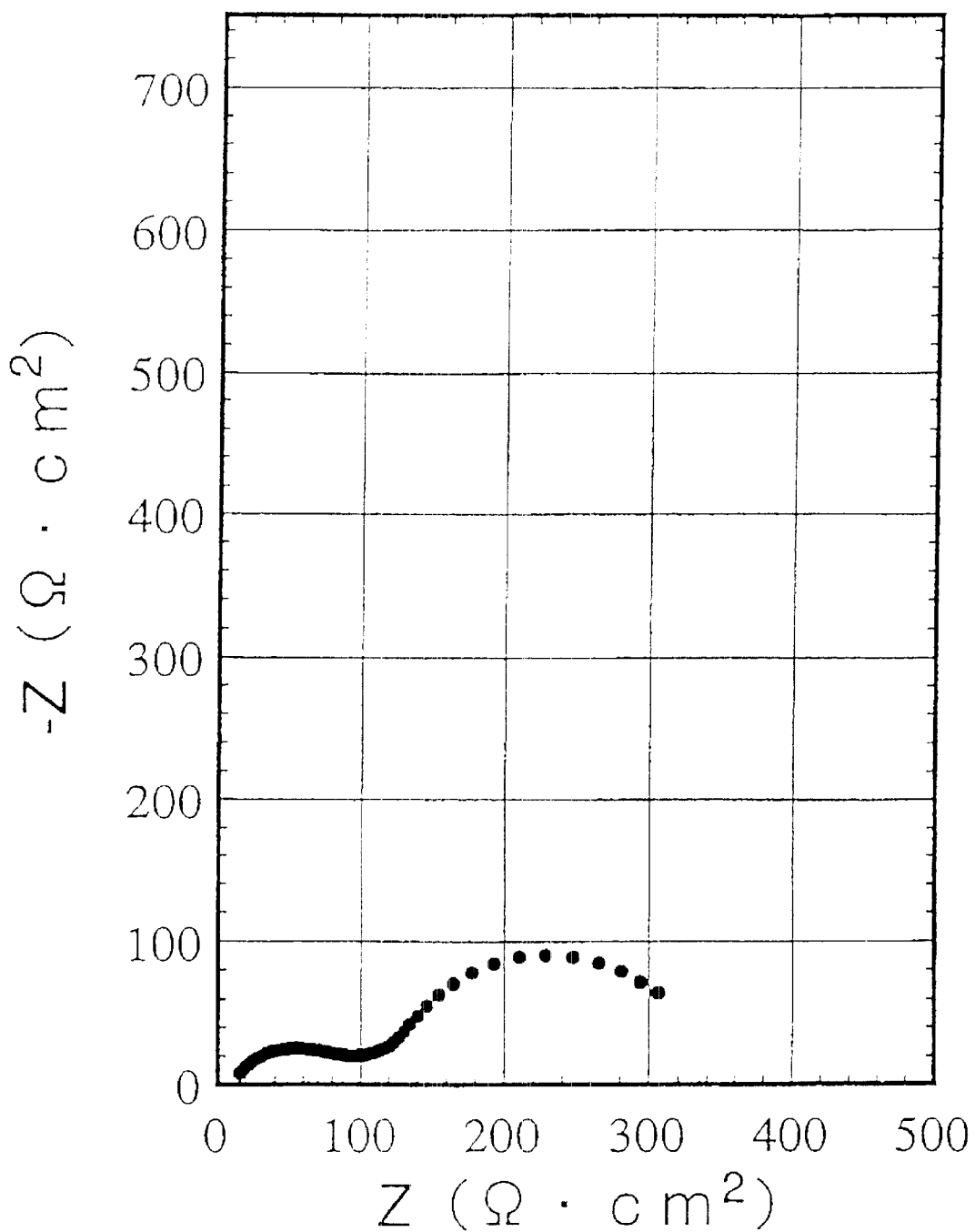
FIG. 6 shows the Cole-Cole plot at 60° C. for a lithium polymer battery comprising a solid polymer electrolyte, which is an embodiment of the invention, after 500 hours of storage at 60° C.

The battery constructed as described above was evaluated, after 200 hours or 500 hours of storage in a charged state at 60° C., for alternating current impedance characteristics (frequency: 20,000 to 0.1 Hz, ΔV: 10 mV) at 60° C. The Cole-Cole plots obtained are shown in FIG. 5 (200 hours) and FIG. 6 (500 hours). The bulk resistance, cathode side resistance and anode side resistance which could be read therefrom are shown in Table 2.

TABLE 2

|  | Initial bulk resistance (Ω · cm$^2$) | Cathode side resistance (Ω · cm$^2$) | Anode side resistance (Ω · cm$^2$) |
| --- | --- | --- | --- |
| 0 hour | 8 | 68 | 187 |
| 200 hours | 8 | 76 | 168 |
| 500 hours | 9 | 95 | 235 |

While the resistance presumably due to the cathode increased 1.4-fold, namely from 68 Ω to 95 Ω, and the resistance presumably due to the anode increased 1.3-fold, namely from 187 Ω to 235 Ω. no changes were observed in bulk resistance even after 500 hours of storage. This fact indicates that the battery has a sufficient level of storage stability which renders the same usable as a battery.

Evaluation for Charge-discharge Characteristics after Storage

Figure 7:
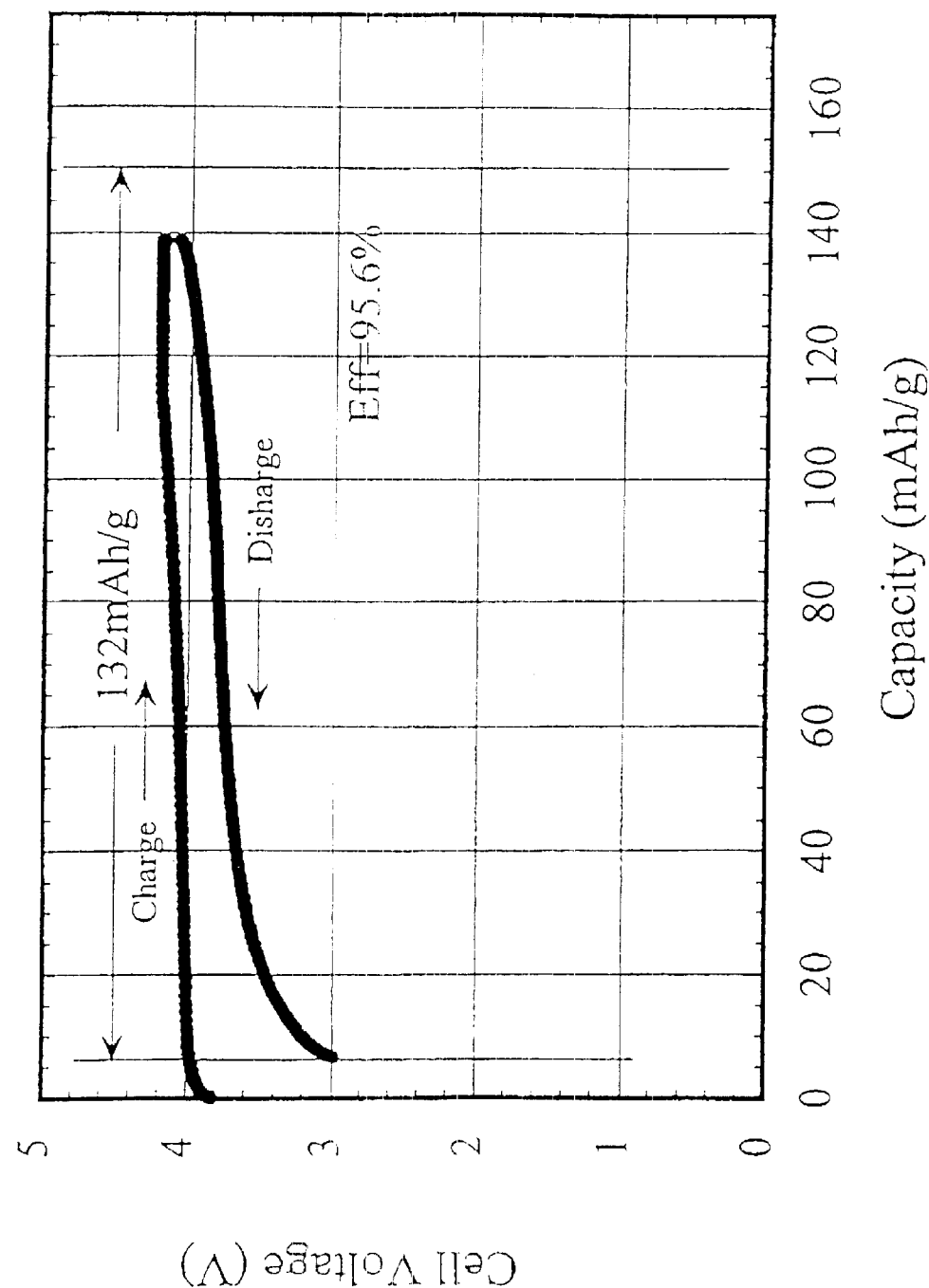
FIG. 7 shows the charge-discharge characteristics of a lithium polymer battery comprising a solid polymer electrolyte, which is an embodiment of the invention, after 500 hours of storage at 60° C.

The battery was evaluated, after 500 hours of storage at 60° C., for charge-discharge characteristics. The results are shown in FIG. 7. The capacity was 132 mAh/g and the efficiency was 95.6%; thus, no significant deterioration was observed as compared with the initial charge-discharge characteristics.

EXAMPLE 5

Synthesis of a Polysiloxane having a Polyethylene Oxide Structure and a Cyclic Carbonate Structure A reaction vessel was charged with 3 g of polymethylhydrogensiloxane, about 15 g of toluene and 7.0×10$^{-4}$ millimoles of platinum-vinylsiloxane, and the mixture was stirred at a reaction temperature of 80° C. To this mixture was added dropwise 7.2 g (30 mmol) of allyl-terminated polyethylene oxide with an average molecular weight of 400. After completion of the dripping, the reaction was allowed to proceed for 2 hours and the toluene was then distilled off under reduced pressure. As a result, a polysiloxane with a polyethylene oxide introduction percentage of 60% was obtained. To 8.0 g of the thus-obtained polyethylene oxide-modified polysiloxane was added dropwise a mixed solution composed of 0.6 g (3.7 mmol) of 4-(2-propenyloxymethyl)-1,3-dioxolan-2-one, 1.1×10$^{-3}$ millimoles of platinum-vinylsiloxane and about 8 g of acetonitrile. Three hours after completion of the dripping, 1.1×10$^{-3}$ millimoles of platinum-vinylsiloxane was further added. Thereafter, the solvent was distilled off to give a polysiloxane having 60% moiety modified with polyethylene oxide and 27% moiety modified with the cyclic carbonate.

Polymer Battery Construction

A 3.0-g portion of the polysiloxane obtained as described above was admixed with a solution of 91 mg (0.30 mmol) of bisphenol A diallyl ether, $9.0 \times 10^{-4}$ millimoles of platinum-vinylsiloxane and 536 mg (3.4 mmol) of $LiCF_3SO_3$ in about 2 ml of THF. The resulting mixture was heated at 90° C. for 2 hours using a pressing machine. As a result, the tetrahydrofuran evaporated and the hydrosilylation reaction proceeded to give a colorless transparent thin film-like substance. This thin film-like substance obtained was measured for ionic conductivity by the alternating current method using platinum electrodes at a voltage of 0.5 V in a frequency range of 42 Hz to 5 MHz. As a result, the ionic conductivity at 25° C. as calculated by the complex impedance method was $1.2 \times 10^{-4}$ S/cm.

The above thin film-like substance was impregnated with 10% by weight, 20% by weight or 25% by weight, relative to the thin film-like substance, of propylene carbonate. For each impregnated substance, the ionic conductivity was calculated in the same manner as above. As a result, the ionic conductivity at 25° C. was found to be $4.2 \times 10^{-4}$ S/cm (10 wt %), $8.2 \times 10^{-4}$ S/cm (20 wt %) or $1.1 \times 10^{-3}$ S/cm (25 wt %).

INDUSTRIAL APPLICABILITY

The curable composition for polymer electrolyte according to the invention is excellent in workability, and the polymer electrolyte obtained from the curable composition for polymer electrolyte according to the invention shows a high level of ionic conductivity with low temperature dependency and has a sufficient level of mechanical strength. Therefore, the prevention of fluidity and improvements in mechanical strength and workability/moldability, which cannot have been achieved with the conventional polymer electrolytes, can be accomplished. Furthermore, the polymer battery comprising the polymer electrolyte of the invention has such levels of characteristics that render the same usable as a practical battery as far as the alternating current impedance characteristics, charge-discharge characteristics and storage stability are concerned.

What is claimed is:

1. A curable composition for polymer electrolyte which comprises the following constituents (A) to (D) as essential constituents:

(A) a polysiloxane having a polyethylene oxide structure-containing group and/or a cyclic carbonate structure-containing group as a substituent on a silicon atom and having two or more SiH groups;

(B) a compound having at least one structure selected from the group consisting of a phenylene unit, a siloxy linkage, an Si—N bond, a carbonyl group, an amide linkage and an amino group and having two or more alkenyl groups;

(C) a hydrosilylation catalyst; and (D) an electrolyte salt compound, wherein the compound (B) is substantially free of any polyethylene oxide structure.

2. The curable composition for polymer electrolyte according to claim 1,
   wherein 10 to 95% of all silicon atoms in the polysiloxane (A) have a polyethylene oxide structure-containing group with a degree of polymerization of oxyethylene units of 1 to 12 as a substituent thereon.

3. The curable composition for polymer electrolyte according to claim 1,
   wherein 40 to 90% of all silicon atoms in the polysiloxane (A) have a polyethylene oxide structure-containing group with a degree of polymerization of oxyethylene units of 1 to 12 as a substituent thereon.

4. The curable composition for polymer electrolyte according to claim 1,
   wherein the polysiloxane (A) is substantially free of any hydrolyzable silyl group.

5. The curable composition for polymer electrolyte according to claim 1,
   wherein the compound (B) has a molecular weight of not more than 500.

6. The curable composition for polymer electrolyte according to claim 1,
   wherein the compound (B) comprises at least one compound selected from the group consisting of bisphenol A diallyl ether, 2,2'-diallylbisphenol A, divinylbenzene, 1,3-divinyl-1,1,3,3-tetramethyldisiloxane, 1,3-divinyl-1,1,3,3-tetramethyldisilazane, diallyl maleate, diallyl succinate, diallyl carbonate, diallyl dicarbonate, allyl-terminated acrylic polymers, 1,3-diallylurea, diallylamine and diallyl phthalate.

7. The curable composition for polymer electrolyte according to claim 1,
   wherein the hydrosilylation catalyst (C) comprises at least one compound selected from the group consisting of platinum compounds, ruthenium compounds and rhodium compounds.

8. The curable composition for polymer electrolyte according to claim 1,
   wherein the electrolyte salt compound (D) is composed of a cation selected from the group consisting of metal cations, ammonium ions, amidinium ions and guanidium ions and an anion selected from the group consisting of chloride ion, bromide ion, iodide ion, perchlorate ion, thiocyanate ion, tetrafluoroborate ion, nitrate ion, $AsF_6^-$, $PF_6^-$, stearylsulfonate ion, octylsulfonate ion, dodecylbenzenesulfonate ion, naphthalenesulfonate ion, dodecylnaphthalenesulfonate ion, $R^1SO_3^-$, $(R^1SO_2)(R^2SO_2)N^-$ and $(R^1SO_2)(R^2SO_2)(R^3SO_2)C^-$, in each formula, $R^1$, $R^2$ and $R^3$ each representing an electron attracting group.

9. The curable composition for polymer electrolyte according to claim 8,
   wherein the electron-attracting groups represented by $R^1$, $R^2$ and $R^3$ are the same or different and each is a perfluoroalkyl group containing 1 to 6 carbon atoms or a perfluoroaryl group.

10. The curable composition for polymer electrolyte according to claim 8,
    wherein the metal cation is a cation of a metal selected from among metals belonging to the group 1 or 2 of the periodic table of the elements.

11. The curable composition for polymer electrolyte according to claim 10,
    wherein the metal cation is the lithium cation.

12. The curable composition for polymer electrolyte according to claim 11,
    wherein the electrolyte salt compound (D) is $LiClO_4$, $LiPF_6$, $LiBF_4$, $LiCF_3SO_3$, $LiN(CF_3SO_2)_2$ or $Li(C_2F_5SO_2)_2$.

13. The curable composition for polymer electrolyte according to claim 8,
    wherein the metal cation is a cation of a transition metal.

14. The curable composition for polymer electrolyte according to claim 13,
    wherein the metal cation is a cation of a metal selected from the group consisting of manganese, iron, cobalt, nickel, copper, zinc and silver.

15. The curable composition for polymer electrolyte according to claim 1, wherein the electrolyte salt compound (D) is contained in an amount of 0.10 to 5.0 millimoles per gram of the curable composition for polymer electrolyte.

16. The curable composition for polymer electrolyte according to claim 1, which comprises an organic electrolyte.

17. The curable composition for polymer electrolyte according to claim 16, wherein the organic electrolyte comprises at least one member selected from the group consisting of propylene carbonate, ethylene carbonate, diethyl carbonate, dimethyl carbonate, ethyl methyl carbonate, γ-butyrolactone, 1,3-dioxolane, dimethoxyethane, tetrahydrofuran, dimethyl sulfoxide and polyethylene glycol dimethyl ether.

18. A polymer electrolyte obtained from the curable composition for polymer electrolyte according to claim 1.

19. A polymer electrolyte obtained from the curable composition for polymer electrolyte according to claim 16.

20. A polymer electrolyte according to claim 18, which is provided with a nonwoven fabric.

21. A polymer battery having a structure such that the polymer electrolyte according to claim 18 is disposed between an anode and a cathode.

22. A polymer battery according to claim 21, wherein the cathode comprises at least one member selected from the group consisting of metallic lithium, lithium alloys, inorganic materials containing lithium occluded therein and carbonaceous materials containing lithium occluded therein.

23. A polymer battery having a structure such that the polymer electrolyte according to claim 19 is disposed between an anode and a cathode.

24. A polymer battery having a structure such that the polymer electrolyte according to claim 20 is disposed between an anode and a cathode.

* * * * *